(No Model.)
H. H. LLOYD.
SECONDARY BATTERY.
No. 490,254. Patented Jan. 17, 1893.
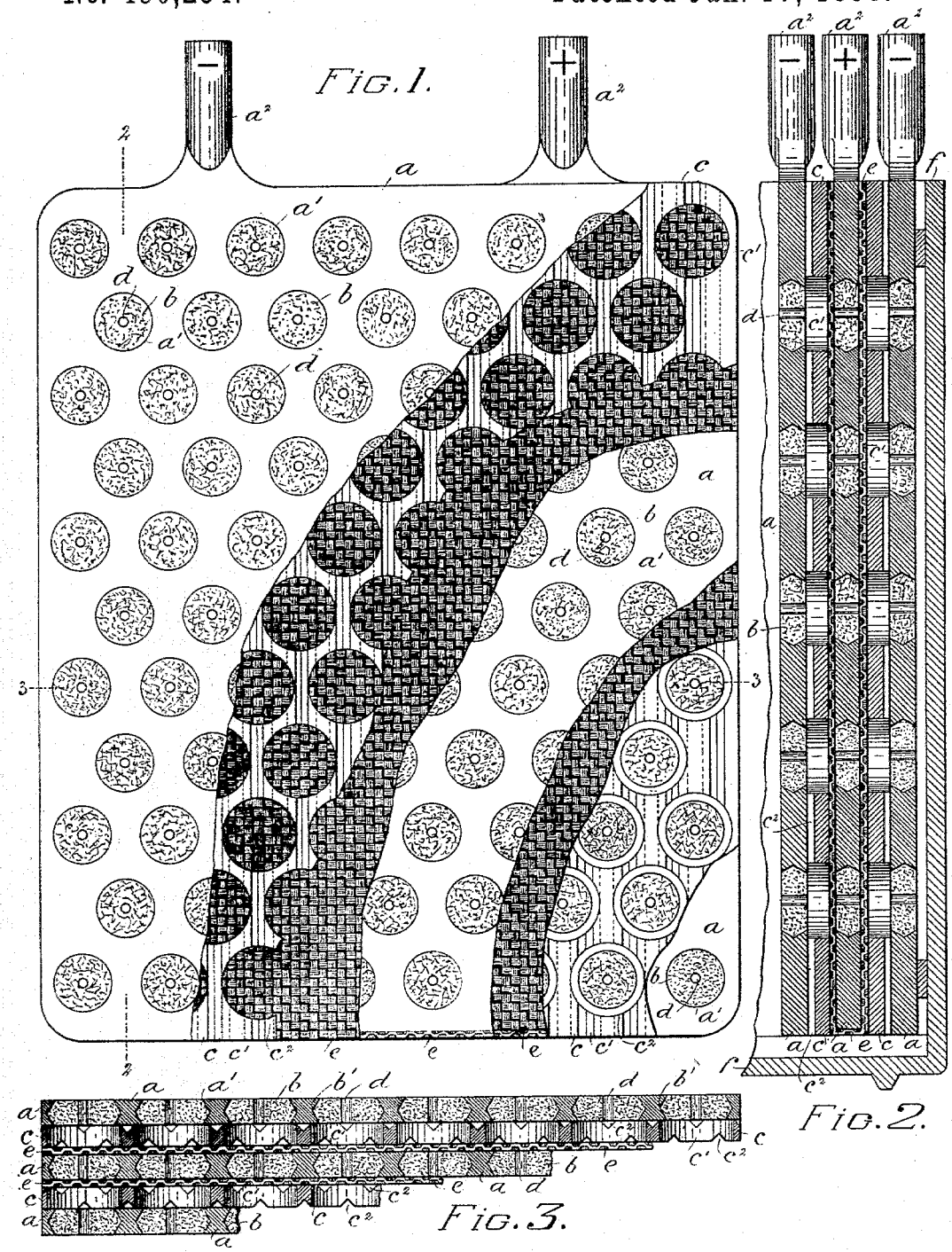
WITNESSES:
Thomas M. Smith.
Richard C. Maxwell.
INVENTOR.
Henry Herbert Lloyd,
BY J. Walter Douglass.
ATT'Y.

UNITED STATES PATENT OFFICE.

HENRY HERBERT LLOYD, OF PHILADELPHIA, PENNSYLVANIA, ASSIGNOR TO THE ELECTRIC STORAGE BATTERY COMPANY, OF GLOUCESTER CITY, NEW JERSEY.

SECONDARY BATTERY.

SPECIFICATION forming part of Letters Patent No. 490,254, dated January 17, 1893.

Application filed August 30, 1892. Serial No. 444,565. (No model.)

*To all whom it may concern:*

Be it known that I, HENRY HERBERT LLOYD, a subject of the Queen of Great Britain, but now residing at the city of Philadelphia, in the county of Philadelphia and State of Pennsylvania, have invented certain new and useful Improvements in Secondary or Storage Batteries, of which the following is a specification.

My invention in general relates to secondary or storage batteries, but more particularly to certain improvements in the arrangement of the plates or electrodes and in the construction of the accessories thereof.

The principal objects of my present invention are first, to provide a secondary or storage battery, which is not apt to become short circuited and which is especially adapted for use under the conditions which frequently occur in traction work and the like, and which involves considerable jarring or vibrating and heavy and sudden discharging; and second, to provide a comparatively inexpensive battery plate or electrode of great mechanical strength, of low internal resistance and of high conductivity, and in which the active material is effectually protected from disintegration, scaling and local influences ordinarily calculated to deteriorate the efficiency of the battery.

My improved battery plate or electrode comprises a perforated conducting support having pieces of active material or material adapted to become active, as cast chloride of lead with or without an admixture of chloride of zinc, supported in perforations thereof. It is of course important that these pieces of active material or pieces of material adapted to become active should adhere firmly to the support, and I attain this result by forming a "rabbet" or matched joint between the adjacent portions of each of the pieces of active material or pieces of material adapted to become active and the support. These rabbet or matched joints not only impart great mechanical strength to the plate, but also reduce the internal resistance thereof, by reason of the close proximity of the conducting support to all parts of the active material or to those adapted to become active. Moreover, in producing my improved plate or electrode I cast the supporting material around the pieces of active material or material adapted to become active under heavy pressure, so that very perfect contact is obtained between the two, and this contact is, of course improved by the expansion of the active material or material adapted to become active, that occurs during the operations of forming and charging the plate. However, in the use of such a plate or electrode in which the active material is to a certain extent enveloped in the support, a comparatively large surface of supporting material would be exposed to the action of the current, thus causing either serious corrosion of the support or waste of energy due to the fact that gas would be given off at the support instead of doing useful chemical work upon the active material or material adapted to become active. To obviate this defect I protect the support from the action of the current by means of an acid proof insulating separator or distance-piece and I design this insulating acid proof distance-piece or separator in such manner that while the supports of two adjacent plates, for example, a positive and a negative are practically covered the active material is uncovered and is exposed to the action of the electrolyte. This result is important and is accomplished by providing the separator or distance-piece with transversely ranging apertures that register with the pieces of active material or pieces of material adapted to become active and with the longitudinally ranging channels that serve to conduct the electrolyte to the respective apertures of the separator or distance-pieces. The transversely ranging apertures of the distance-pieces or separators correspond in number as well as in position with the pieces of active material or material adapted to become active, and consequently are very numerous, so that the webs surrounding the apertures are comparatively small and slender, hence it is important that the strength of the webs should be reduced as little as possible by the cutting away thereof incident to the formation of the longitudinally ranging channels that serve to convey the electrolyte. I attain this result by making these channels of V-shape in cross section, and by disposing the channels upon one side or face of the separators or distance-pieces intermediate of the channels upon the other side or face thereof. Even when constructed in the manner hereinabove explained the active material or material adapted to become active of the positive electrodes or plates when subjected to a sudden and rapid forming and discharging as in traction work, is exceedingly apt to disintegrate and fall to the bottom of the vase or cell, in which position it would tend to contact with and bridge across two plates or electrodes of opposite polarity and thus short circuit the battery. I avoid this objectionable feature by interposing a textile fabric that is not injuriously affected by the electrolyte as woven asbestus cloth between the positive plate and its complemental separators or distance-pieces in such manner that it extends across the active material and is folded around the lower portion of the plate or electrode into position for securing and retaining any particles that may scale off or drop from the active material. This peculiar construction is productive of many beneficial results, of which the following may be particularly mentioned; first, the current following the path of least resistance that is, the shortest path, attacks the active material only. It being understood that the solid portions of the separators or distance-pieces set up sufficient additional resistance to protect the support; second, the textile woven or other similar fabric forms a sort of net work overlying the active material or material adapted to become active and this net work forms a mechanical support for the face of the active material or material adapted to become active, and thus prevents scaling or rapid disintegration of the same, or any impairing of the efficiency of the battery; and thus, the textile fabric retains any portion of the active material or material adapted to become active that may be detached, and prevents accidental short circuiting of the battery. In some instances additional perforations are provided, extending through the active material or material adapted to become active, in order to afford the electrolyte access to the internal portions of the active material or material adapted to become active.

The nature, objects and scope of my invention will be more fully understood from the following description taken in connection with the accompanying drawings forming part hereof; and in which Figure 1, is a view partly in side elevation and partly in section of my invention, showing a positive plate or electrode, a woven or textile fabric folded around the same and covering the respective faces thereof, a negative plate or electrode located on each side of the positive plate or electrode and separators or distance-pieces between the negative plates or electrodes and the positive plate surrounded with a textile or woven fabric cover or protector. Fig. 2, is a sectional view taken on the line 2—2 of Fig. 1, showing portions of an electrolytic vase or cell; and Fig. 3, is a sectional view taken on the line 3—3 of Fig. 1.

In the drawings $a$, is a conducting support provided with perforations $a'$, and with a lug or terminal $a^2$.

$b$, are pieces of active material or material conditioned to become active, as cast chloride of lead with or without an admixture of chloride of zinc, supported in the respective perforations $a'$, and having their extremities or exposed portions substantially flush with the respective faces of the support $a$. These pieces $b$, of active material or material adapted to become active are prevented from falling out of the perforations $a'$, by means of well known "rabbet" or matched joints $b'$, in substantially the same manner as the glass plates of windows are held to place in their supporting frame-work. In producing the above described plate the support $a$, is preferably dense and may be cast around the pieces $b$, of active material or material adapted to become active under heavy pressure, so that very perfect contact is obtained between the two, and this contact is of course improved by the expansion of the pieces $b$, that always occurs during the operation of forming and charging the plate. The faces of the support $a$, are protected by insulating distance-pieces or separators $c$, made of hard rubber, celluloid, wood or other preferred material and provided with rows of transversely ranging apertures $c'$, that correspond in number and are disposed in alignment with the pieces $b$, of active material or material adapted to become active.

$c^2$, are longitudinally ranging V or other shaped channels that communicate with apertures $c'$, and afford means for permitting of the free circulation of the electrolyte. The channels $c^2$, upon one side or face of the separator or distance-piece $c$, are located intermediate of the channels $c^2$, upon the other side or face thereof, Fig. 3. By this disposition and arrangement of the channels the cross sectional area of the separator or distance-piece $c$, is not materially reduced, so that the strength and rigidity thereof, are not materially diminished.

$d$, are channels that may extend through the pieces $b$, of active material in order to afford the electrolyte access to the internal portions thereof.

$e$, is a piece of acid proof woven cloth or textile fabric as asbestus or other preferred material, folded around the positive plate or electrode and the respective faces thereof and the separators or distance-pieces $c$, as shown in Fig. 2, so that the textile or woven fabric extends across the pieces $b$, of active material or material adapted to become active and constitutes a sort of overlying net work as shown in Fig. 1.

In practice the hereinabove described plates or electrodes may be prepared for use in a secondary battery or accumulator by constituting them the positive plates or electrodes in an electrolytic cell or vase, in which the negative plates may be of lead or other preferred material, as heretofore, and permitting then the ensuing electrolysis to effect the conversion of the pieces $b$, into active material in the ordinary and well understood manner. Two series of such plates may then be constituted the positive and negative electrodes in the vase or cell $f$, of a secondary battery or accumulator as illustrated in Fig. 2. It being understood that the faces of the positive electrodes are covered by the textile or woven asbestus fabric $e$, and that the distance-pieces or separators $c$, are interposed between the positive and negative plates in such manner that the apertures $c'$, are in alignment with the pieces $b$, of active material. Under these circumstances the distances-pieces or separators $c$, serve to keep the plates apart without interfering with or otherwise impeding the free access of the electrolyte to the active material, so that the plates may be charged and discharged in any preferred manner. Moreover, these distance-pieces or separators $c$, protect the supports $a$, from the action of the electric current or currents, so that the same are protected from corrosion, and therefore, all of the available current is utilized for oxidizing or otherwise chemically affecting the active material. The textile or woven fabric $e$, that overlies the faces of the pieces $b$, of active material of the positive plates or electrodes forms a chemical support for the face of the active material, thereby preventing scaling or rapid disintegration of the active material, and permitting the plates to be advantageously used under conditions which involve heavy and sudden discharge and rough handling, such as occur in traction work.

Having thus described the nature and objects of my invention, what I claim as new and desire to secure by Letters Patent is:—

1. A battery plate or electrode comprising a conducting support and its complemental active material or material adapted to become active, distance-pieces or separators disposed adjacent to the support and provided with transversely ranging apertures opposite the active material or material adapted to become active and with longitudinally ranging and staggered channels, and a textile or woven fabric disposed intermediate of the distance-pieces or separators and the faces of the positive plate or electrode, substantially as and for the purposes set forth.

2. A battery plate or electrode comprising a conducting support and its complemental active material or material adapted to become active, distance-pieces or separators covering the support and provided with longitudinally ranging and staggered channels and with transversely ranging apertures disposed opposite the active material or material adapted to become active and a textile or woven fabric folded around the positive plate or electrode and overlying the active material or material adapted to become active thereof, substantially as and for the purposes set forth.

3. A battery plate or electrode comprising a conducting support and complemental active material or material adapted to become active, and distance-pieces or separators covering the support and provided with transversely ranging apertures disposed opposite the active material or material adapted to become active and with longitudinally ranging and staggering channels, substantially as and for the purposes set forth.

4. In a secondary or storage battery, positive and negative plates or electrodes comprising respectively a support and complemental active material or material adapted to become active, separators or distance-pieces interposed between said plates or electrodes and provided respectively with transversely ranging apertures in alignment with the active material of said plates and with longitudinally ranging and staggered channels, and a textile or woven fabric interposed between the respective faces of the positive plates or electrodes and the distance-pieces or separators, substantially as and for the purposes set forth.

5. A secondary or storage battery comprising a vase or cell, an electrolyte, two series of plates composed respectively of supports and complemental active material or material adapted to become active, separators or distance-pieces interposed between said plates and provided with longitudinally ranging staggered channels and with transversely ranging apertures disposed opposite the active material or material adapted to become active and a textile or woven fabric covering medium intermediate of the positive plates and separators or distance-pieces and overlying the active material or material adapted to become active, substantially as and for the purposes set forth.

In testimony whereof I have hereunto set my signature in the presence of two subscribing witnesses.

HENRY HERBERT LLOYD.

Witnesses:
THOMAS M. SMITH,
RICHARD C. MAXWELL.